(12) United States Patent
Suciu et al.

(10) Patent No.: US 8,365,511 B2
(45) Date of Patent: Feb. 5, 2013

(54) TIP TURBINE ENGINE INTEGRAL CASE, VANE, MOUNT AND MIXER

(75) Inventors: Gabriel L. Suciu, Glastonbury, CT (US); James W. Norris, Lebanon, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 952 days.

(21) Appl. No.: 11/720,543

(22) PCT Filed: Dec. 1, 2004

(86) PCT No.: PCT/US2004/039990
§ 371 (c)(1),
(2), (4) Date: May 31, 2007

(87) PCT Pub. No.: WO2006/059979
PCT Pub. Date: Jun. 8, 2006

(65) Prior Publication Data
US 2008/0008583 A1    Jan. 10, 2008

(51) Int. Cl.
*F02K 3/02* (2006.01)
(52) U.S. Cl. .......................... 60/39.5; 60/268
(58) Field of Classification Search .................. 60/39.5, 60/268, 189; 415/189, 191, 115, 209, 79
See application file for complete search history.

(56) References Cited

U.S. PATENT DOCUMENTS

| | | | |
|---|---|---|---|
| 1,544,318 A | 6/1925 | Hodgkinson | |
| 2,221,685 A | 11/1940 | Smith | |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,801,789 A | 8/1957 | Moss | |
| 2,830,754 A | 4/1958 | Stalker | |

(Continued)

FOREIGN PATENT DOCUMENTS

| | | |
|---|---|---|
| DE | 1301364 | 8/1969 |
| FR | 2274788 | 1/1976 |

(Continued)

OTHER PUBLICATIONS

Mounting Troubles, Lee S. Langston, Mar. 2011, American Society of Mechanical Engineering, Mechanical Engineering magazine, pp. 47-49.*

*Primary Examiner* — Ehud Gartenberg
*Assistant Examiner* — Vikansha Dwivedi
(74) *Attorney, Agent, or Firm* — Carlson, Gaskey & Olds, P.C.

(57) ABSTRACT

A tip turbine engine assembly includes an engine support structure with a rear case, exit guide vanes, an exhaust mixer, and engine mounts. The rear case is disposed about an engine centerline. The exit guide vanes extend radially inwardly from the rear case. The exhaust mixer extends in a flow path of a combustor to mix a high energy gas stream from the combustor with bypass air from a bypass fan. The engine mounts are located on the periphery of the rear case for mounting the engine to an aircraft. The rear case, exit guide vanes, exhaust mixer, and engine mounts form a unitary engine support structure which is installable as a single piece into an engine.

22 Claims, 4 Drawing Sheets

U.S. PATENT DOCUMENTS

| | | |
|---|---|---|
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flail |
| 3,675,418 A * | 7/1972 | Lenkeit et al. .................. 60/797 |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A * | 8/1993 | Girault .................. 415/58.5 |
| 5,267,397 A | 12/1993 | Wilcox |
| 5,269,139 A | 12/1993 | Klees |
| 5,275,536 A | 1/1994 | Stephens et al. |
| 5,313,779 A * | 5/1994 | Rodgers .................. 60/785 |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Liston et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059978 | 6/2006 |
| WO | 2006059988 | 6/2006 |
| WO | 2006059989 | 6/2006 |
| WO | 2006060006 | 6/2006 |
| WO | 2006062497 | 6/2006 |
| WO | 2006059971 | 8/2006 |
| WO | 2006059979 | 6/2007 |

* cited by examiner

TIP TURBINE ENGINE INTEGRAL CASE, VANE, MOUNT AND MIXER

This invention was made with government support under Contract No.: F33657-03-C-2044. The government therefore has certain rights in this invention.

BACKGROUND OF THE INVENTION

The present invention relates to a tip turbine engine, and more particularly to a integral engine support structure including a rear case, exit guide vanes, an exhaust mixer, and engine mounts.

An aircraft gas turbine engine of the conventional turbofan type generally includes a forward bypass fan and a low pressure compressor, a middle core engine including a combustor, and an aft low pressure turbine all located along a common longitudinal axis. Although highly efficient, conventional turbofan engines operate in an axial flow relationship. The axial flow relationship results in a relatively complicated elongated engine structure and, therefore requires separate engine cases for the bypass fan, low pressure compressor, combustor, and low pressure turbine. Each engine case may further include several joints, structural attachments, and accessory parts, often making assembly of the engine cases laborious and expensive.

A recent development in gas turbine engines is the more longitudinally compact tip turbine engine. Tip turbine engines locate an axial compressor forward of a bypass fan, which includes hollow fan blades that receive airflow from the axial compressor therethrough such that the hollow fan blades operate as a centrifugal compressor. Compressed core airflow from the hollow fan blades is mixed with fuel in an annular combustor located radially outward from the fan. The combustor ignites the fuel mixture to form a high energy gas stream which drives turbine blades that are integrated onto the tips of the hollow bypass fan blades for rotation therewith as disclosed in U.S. Patent Application Publication Nos. 2003192303; 20030192304; and 20040025490. The tip turbine engine provides a thrust to weight ratio comparable to conventional turbofan engines of the same class within a package of significantly shorter longitudinal length.

Accordingly and because of the shorter longitudinal length of the tip turbine engine, it is desirable to provide an integrated rear engine case that includes exit guide vanes, an exhaust mixer, and engine mounts.

SUMMARY OF THE INVENTION

The tip turbine engine assembly according to the present invention provides a unitarily installable engine support structure. The engine support structure includes a rear case portion, exit guide vanes, an exhaust mixer, and engine mounts formed in a casting process. The exit guide vanes extend radially inwardly from the rear case portion. The exhaust mixer extends into the high energy gas stream from a combustor. The engine mounts are located on the periphery of the rear case portion for mounting the engine to an aircraft. The rear case portion, exit guide vanes, exhaust mixer, and engine mounts form a unitary engine support structure that is installable as a single piece into the engine.

In another tip turbine engine case example, the exit guide vanes are fixed to the rear case portion at a welded joint. The rear case portion and exit guide vane are formed separately and welded together to form a unitary engine support structure which is installable as a single piece into an engine.

In another tip turbine engine case example, the exit guide vanes are fixed to the rear case portion with a fastener. The rear case portion and exit guide vane are formed separately and secured together with the fastener to form a unitary engine support structure which is installable as a single piece into an engine.

The present invention therefore simplifies assemblies of several parts by providing an integrated unitarily installable component that includes a rear case, exit guide vanes, an exhaust mixer, and engine mounts.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
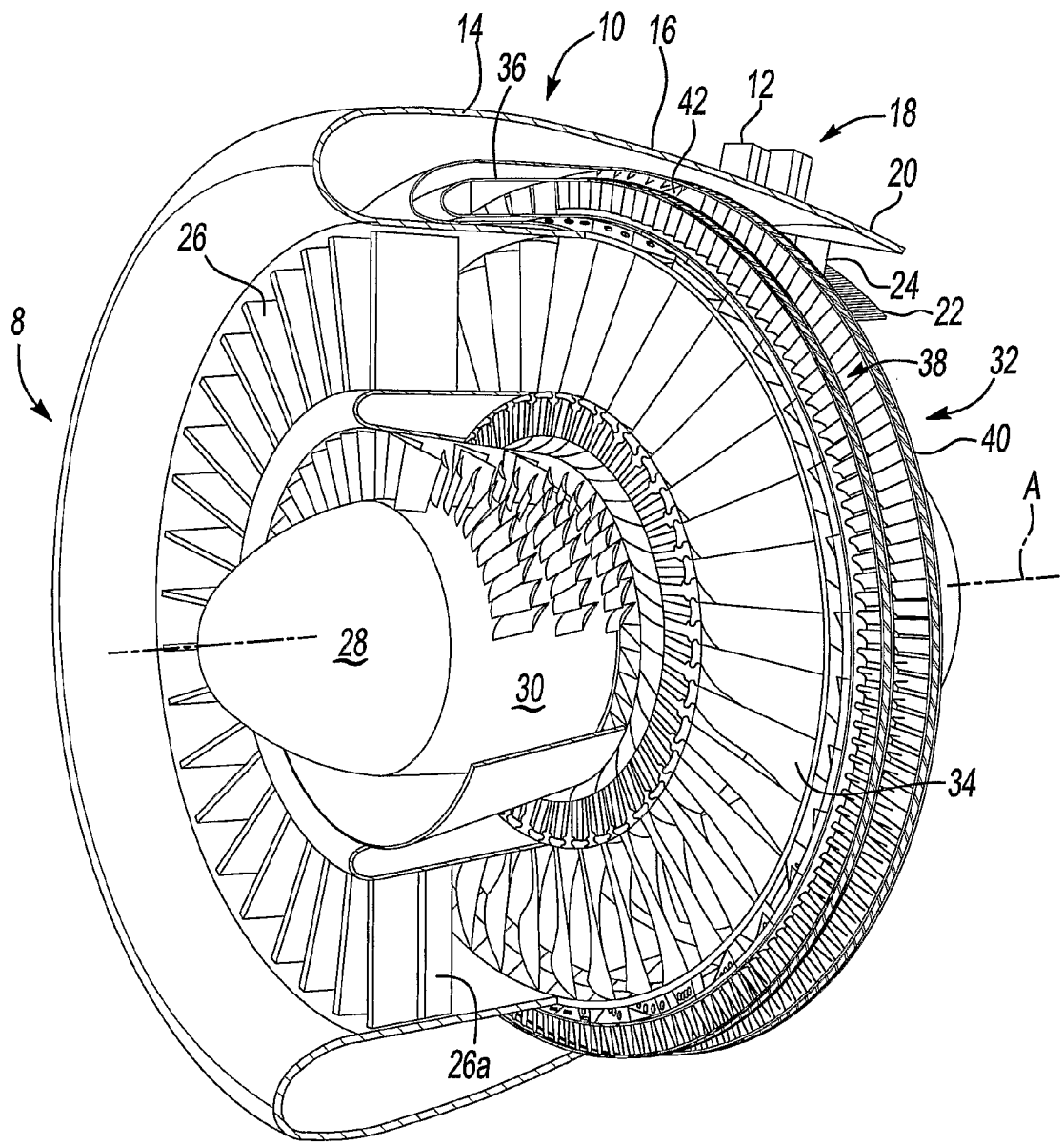
FIG. 1 is a partial sectional perspective view an exemplary tip turbine engine case assembly of the present invention.

FIG. 1 illustrates a partial sectional perspective view of a tip turbine engine (TTE) gas turbine engine 8. The engine 8 includes an outer case 10 with engine mounts 12 located about the periphery for mounting the engine 8 to an aircraft. The outer case 10 includes a forward case portion 14 attached at a welded joint 16 to an engine support structure 18. The engine support structure 18 includes a rear case portion 20, an exhaust mixer 22 and plurality of exit guide vanes 24. The plurality of exit guide vanes 24 extend radially inwardly from the rear case portion 20. A plurality of fan inlet guide vanes 26 are mounted on the forward case portion 14 and extend radially inwardly from the forward case portion 14. Each inlet guide vane 26 preferably includes a variable trailing edge 26A.

A nosecone 28 is preferably located along the engine centerline A to improve airflow into an axial compressor 30. The axial compressor 30 is mounted about the engine centerline A behind the nosecone 28.

A fan-turbine rotor assembly 32 is mounted for rotation about the engine centerline A aft of the axial compressor 30. The fan-turbine rotor assembly 32 includes a plurality of hollow fan blades 34 to provide internal, centrifugal compression of the compressed airflow from the axial compressor 30 for distribution to an annular combustor 36 located within the outer case 10.

A turbine 38 includes a plurality of tip turbine blades 40 (two stages shown) which rotatably drive the hollow fan blades 34 relative to a plurality of tip turbine stators 42 which extend radially inwardly from the outer case 10. The annular combustor 36 is axially forward of the turbine 38 and communicates with the turbine 38.

Figure 2:
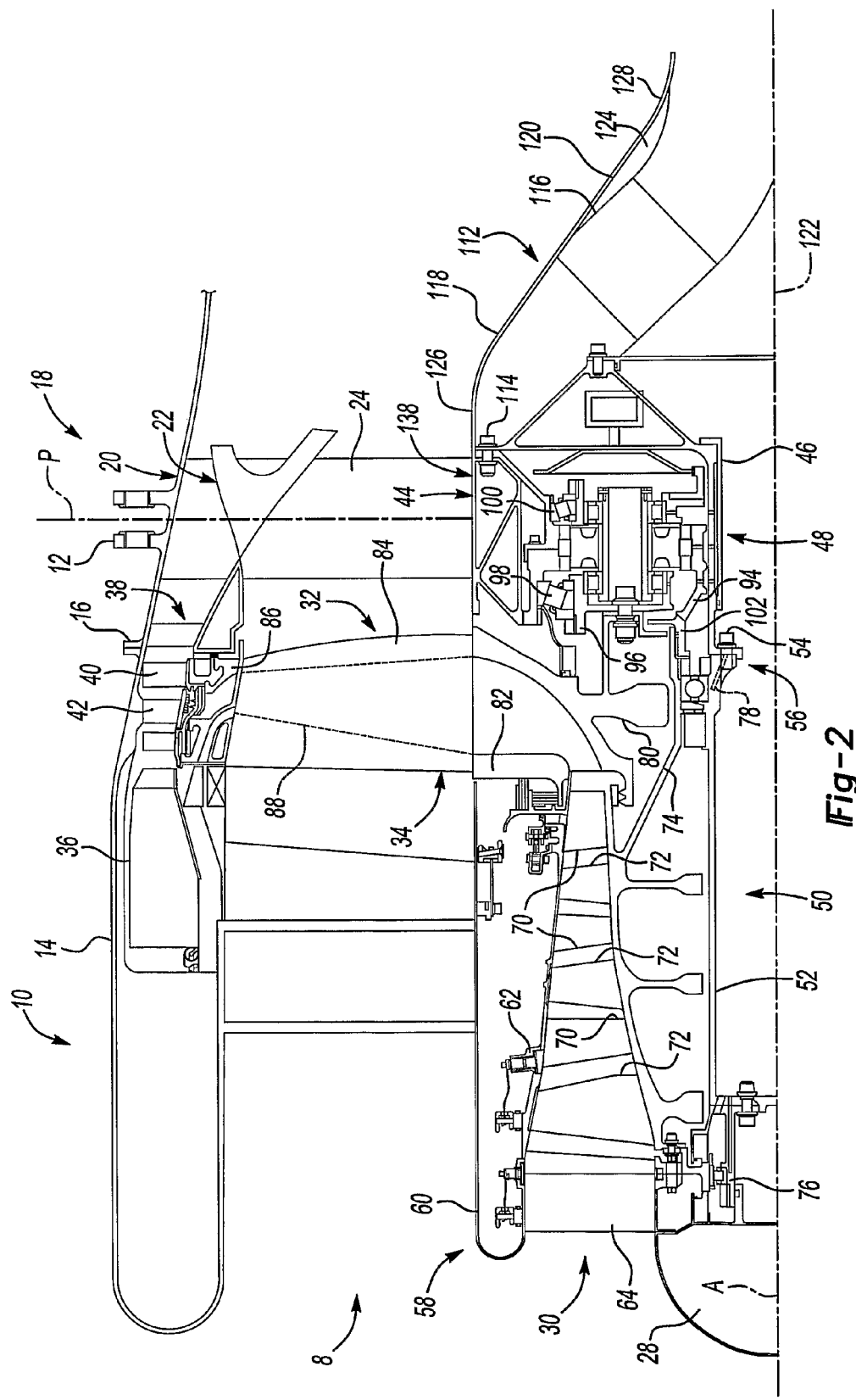
FIG. 2 is a cross-sectional view of the tip turbine engine of FIG. 1.

Referring to FIG. 2, the engine mounts 12 are located on the periphery of the rear case portion 20 and are preferably located aft of the fan-turbine rotor assembly 32 and coplanar with an engine support plane P. The engine mounts 12 preferably are cast from a nickel-based alloy or other alloy with the rear case portion 20 to form the engine support structure 18, however, the engine mounts 12 may alternatively be secured to the rear case portion 20 by welding or with a fastener.

The exit guide vanes 24 of the engine support structure 18 are fixed to a static outer support housing 44. Preferably, the exit guide vanes 24 are fixed by welding. Other methods of attachment, such as by fastener, may be utilized. Preferably, the exit guide vanes 24 are cast from a nickel-based alloy or other alloy with the rear case portion 20 to form the engine support structure 18. Alternatively, the exit guide vanes 24 may be secured to the rear case portion 20 with a fastener, or by other method of attachment. The exit guide vanes 24 define the engine support plane P by virtue of providing radial structural support relative to the engine centerline A.

The engine support structure 18 includes an exhaust mixer 22. The exhaust mixer 22 is preferably cast from a nickel-based alloy or other alloy with the rear case portion 20 to form the engine support structure 18. Alternatively, the exhaust mixer 22 may be secured to the rear case portion 20 by welding or with a fastener.

The static outer support housing 44 forms part of a gearbox housing 46, which houses a gearbox assembly 48. The gearbox housing 46 is fixed to a first rotationally fixed member 50, which is disposed about the engine centerline A. The first rotationally fixed member 50 includes a static inner support shaft 52. The static inner support shaft 52 has a cylindrical shape about the engine centerline A and is fixed to the gearbox housing 46 with a fastener 54 at a flange joint 56.

The axial compressor 30 includes a splitter 60 and a compressor case 62 fixedly mounted on the splitter 60. The compressor case 62 is spaced radially outwardly relative to the engine centerline A from the static inner support shaft 52 and is coaxial with the static inner support shaft 52. The compressor case 62 is fixedly mounted to a support member 64 that extends radially outwardly from the static inner support shaft 52.

A plurality of compressor vanes 70 extend radially inwardly from the compressor case 62 between stages of compressor blades 72, which are mounted on an axial compressor rotor 74. The compressor blades 72 and compressor vanes 70 are arranged circumferentially about the axial compressor rotor 74 in stages (three stages of compressor blades 72 and compressor vanes 70 are shown in this example). The axial compressor rotor 74 is mounted for rotation between the static inner support shaft 52 and compressor case 62 through a forward bearing assembly 76 and an aft bearing assembly 78.

The fan-turbine rotor assembly 32 includes a fan hub 80 that supports a plurality of the hollow fan blades 34. Each hollow fan blade 34 includes an inducer section 82, a hollow fan blade section 84 and a diffuser section 86. The inducer section 82 receives airflow from the axial compressor 30 generally parallel to the engine centerline A and turns the airflow from an axial airflow direction toward a radial airflow direction. The airflow is radially communicated through a core airflow passage 88 within the fan blade section 84 where the airflow is centrifugally compressed. From the core airflow passage 88, the diffuser section 86 turns the airflow toward an axial airflow direction toward the annular combustor 36. Preferably the airflow is diffused axially forward in the engine 8, however, the airflow may alternatively be communicated in another direction.

The gearbox assembly 48 aft of the fan-turbine rotor assembly 32 provides a speed increase between the fan-turbine rotor assembly 32 and the axial compressor 30. The gearbox assembly 48 includes a sun gear shaft 94 which rotates with the axial compressor 30 and a planet carrier 96 which rotates with the fan-turbine rotor assembly 32 to provide a speed differential therebetween. The gearbox assembly 48 is preferably a planetary gearbox that provides co-rotating or counter-rotating rotational engagement between the fan-turbine rotor assembly 32 and the axial compressor rotor 74. The gearbox assembly 48 is mounted for rotation between the sun gear shaft 94 and the static outer support housing 44 through forward bearings 98 and a rear bearing 99. The forward bearings 98 and the rear bearing 100 are both tapered roller bearings and both handle radial loads. The forward bearing 98 handles the aft axial load, while the rear bearing 100 handles the forward axial loads. The sun gear shaft 94 is rotationally engaged with the axial compressor rotor 74 at a splined interconnection 102 or the like. Alternatively, the gearbox assembly 48 could provide a speed decrease between the fan-turbine rotor assembly 32 and the axial compressor rotor 74.

A tailcone assembly 112 is mounted on the static outer support housing 44 with a set of fasteners 114, although only one fastener is illustrated in the FIG. 2. The tailcone assembly 112 houses a device 116, such as an oil cooler or other device, and includes a frustoconical surface 118. A wall structure 120 disposed about central axis 122 forms the frustoconical surface 118. The wall structure 120 defines an interior compartment 124 and a forward portion 126 that tapers to an aft portion 128 of the tailcone assembly 112.

Figure 3:
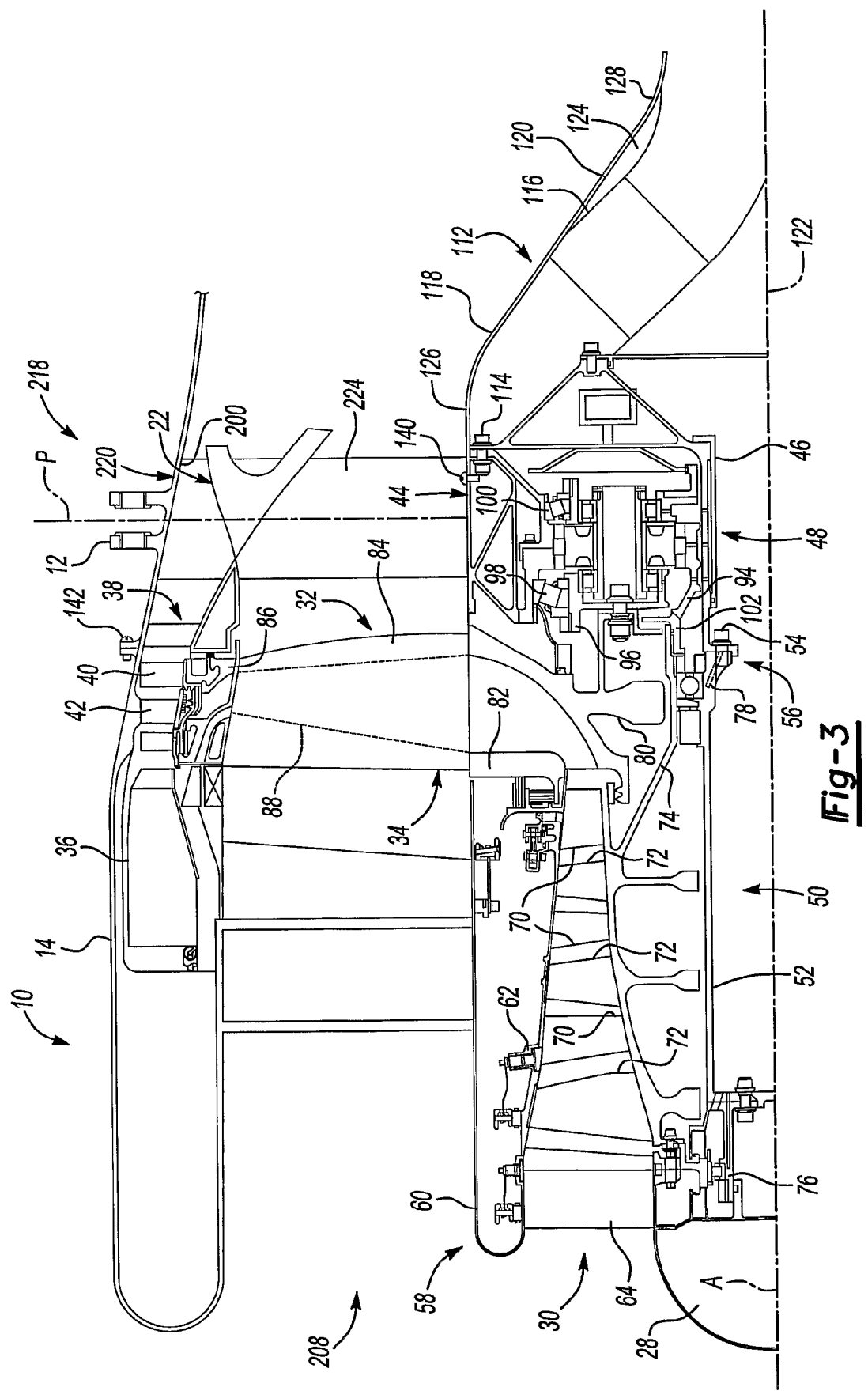
FIG. 3 is a cross-sectional view of another embodiment of a tip turbine engine case assembly of the present invention showing a welded joint.

The engine support structure 18 is a unit that is unitarily installable into the engine 8. That is, the engine support structure 18, which includes the rear case portion 20, engine mounts 12, exhaust mixer 22, and exit guide vanes 24, is installable as a single piece into the engine 8. Installation of the engine support structure 18 includes securing the exit guide vane 24 to the static outer support housing 44 at a welded joint 138. Alternatively, the exit guide vane 24 may be removably secured with a fastener 140 as illustrated in FIG. 3. The rear case portion 20 is secured to the forward case portion 14 at the welded joint 16 or is removably secured with a fastener 142 as illustrated in FIG. 3.

In operation, air enters the axial compressor 30, where it is compressed by the three stages of the compressor blades 72 and compressor vanes 70. The compressed air from the axial compressor 30 enters the inducer section 82 in a direction generally parallel to the engine centerline A and is turned by the inducer section 82 radially outwardly through the core airflow passage 88 of the hollow fan blades 34. The airflow is further compressed centrifugally in the hollow fan blades 34 by rotation of the hollow fan blades 34. From the core airflow passage 88, the diffuser section 86 turns the airflow axially forward in the engine 8 into the annular combustor 36. The compressed core airflow from the hollow fan blades 34 is mixed with fuel in the annular combustor 36 and ignited to form a high-energy gas stream. The high-energy gas stream is expanded over the plurality of tip turbine blades 40 mounted about the outer periphery of the fan-turbine rotor assembly 32 to drive the fan-turbine rotor assembly 32, which in turn drives the axial compressor 30 through the gearbox assembly 48.

Concurrent therewith, the fan-turbine rotor assembly 32 discharges fan bypass air axially aft and the exhaust mixer 22 merges bypass air with the high energy gas stream in the rear case portion 20. The exit guide vanes 24 located between the static outer support housing 44 and the outer case 10 guide the combined airflow out of the engine 8 to provide forward thrust.

FIG. 3 is a cross-sectional view of another embodiment of a tip turbine engine case assembly of the present invention showing a welded joint 200 between a rear case portion 220 and an exit guide vane 224. The rear case portion 220 and exit guide vane 224 are formed separately, such as from a casting process. The exit guide vane 224 is then welded to the rear case portion 220 to form the engine support structure 218, which is unitarily installable into the engine 208. Installation of the engine support structure 218 includes removably securing the exit guide vane 224 with the fastener 140 to the static outer support housing 44. The rear case portion 220 is removably secured to the forward case portion 14 with the fastener 142.

Figure 4:
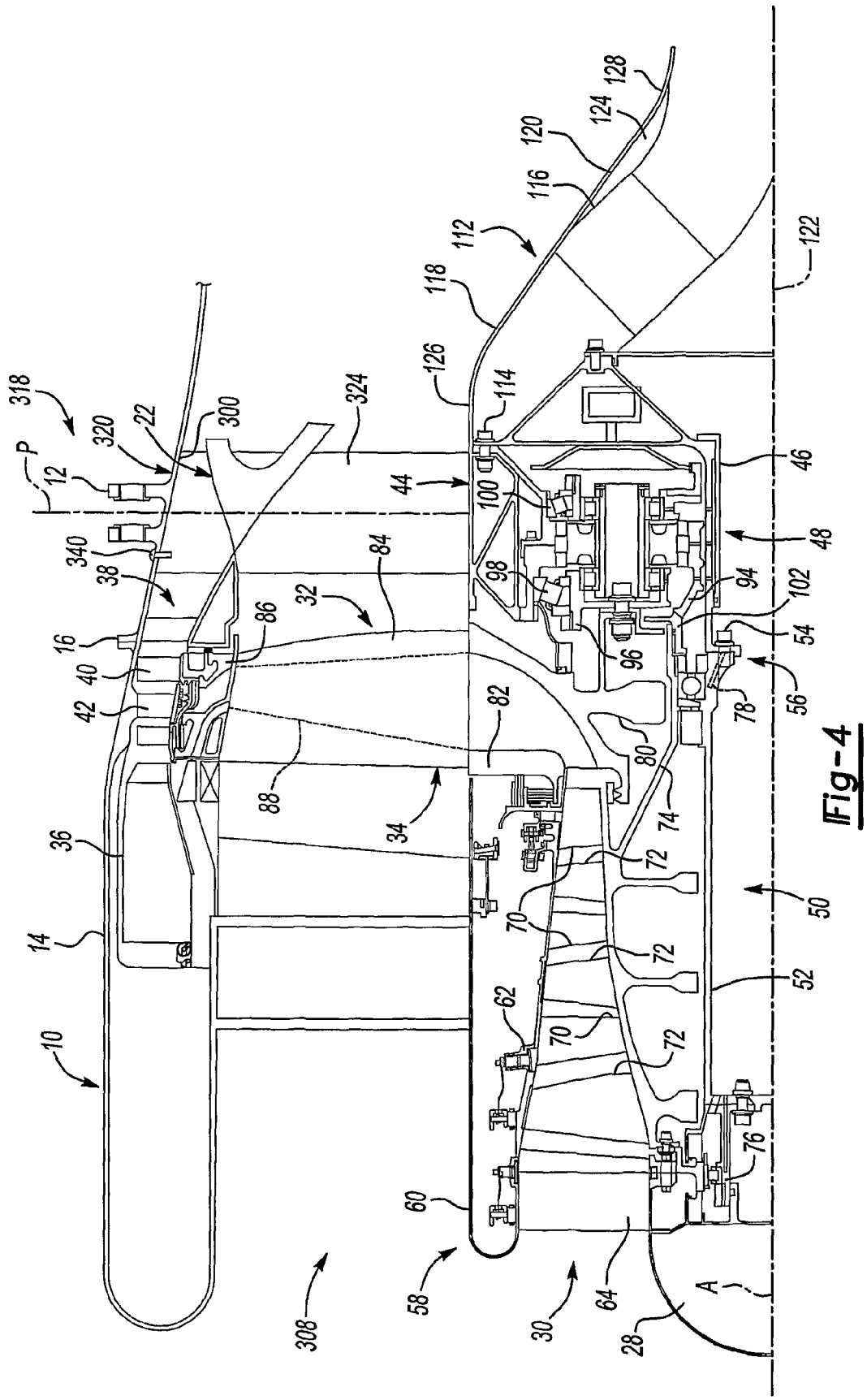
FIG. 4 is a cross-sectional view of another embodiment of a tip turbine engine case assembly of the present invention showing an exit guide vane secured with a fastener.

FIG. 4 is a cross-sectional view of another embodiment of a tip turbine engine case assembly of the present invention showing a joint 300 between a rear case portion 320 and an exit guide vane 324. The rear case portion 320 and exit guide vane 324 are secured together at the joint 300 by a fastener 340. The rear case portion 320 and exit guide vane 324 are formed separately, such as from a casting process. The exit guide vane 324 is then secured to the rear case portion 320 to form the engine support structure 318, which is unitarily installable into the engine 308. The exit guide vane 324 is one of a plurality of exit guide vanes of the engine 308, each secured at a joint with a fastener to the rear case portion 320.

The present invention therefore eliminates assembly and installation of several parts by providing a unitarily installable engine structure that includes a rear case, guide vanes, an exhaust mixer, and engine mounts.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tip turbine engine case assembly comprising:
an engine support structure unitarily installable into an engine aft of a fan-turbine rotor assembly in the tip turbine engine, said engine support structure including an engine case disposed about an engine centerline, an engine mount aft of the fan-turbine rotor assembly, and an exit guide vane fixed to said engine case, said exit guide vane extending radially inwardly from said engine case.

2. The assembly as recited in claim 1, wherein said exit guide vane is fixed to said engine case with a welded joint.

3. The assembly as recited in claim 1, wherein said exit guide vane is formed with said engine case in a casting process.

4. The assembly as recited in claim 1, wherein said exit guide vane is fixed to said engine case with a fastener.

5. The assembly as recited in claim 1, further comprising an exhaust mixer fixed to said engine support structure and extending in a flow path from a combustor.

6. The assembly as recited in claim 1, further comprising an engine mount fixed to said engine case and extending radially from said engine case.

7. The assembly as recited in claim 1, wherein said exit guide vane is one of a plurality of exit guide vanes.

8. The assembly as recited in claim 1, wherein said engine support structure further comprises an exhaust mixer extending in a flow path from a combustor and an engine mount extending radially from said engine case.

9. A tip turbine engine assembly comprising:
a static support;
a fan mounted on said static support, said fan including a hollow fan blade defining a core airflow passage therethrough;
a combustor in fluid communication with said core airflow passage; and
an engine support structure unitarily installable on said static support aft of a fan-turbine rotor assembly in the tip turbine engine, said engine support structure including an engine case disposed about an engine centerline and an exit guide vane fixed to said engine case, said exit guide vane extending radially inward from said engine case.

10. The assembly as recited in claim 9, further comprising an axial compressor upstream from and in fluid communication with said fan.

11. The assembly as recited in claim 9, wherein said engine support structure is downstream from said fan and said combustor.

12. A method of assembling a tip turbine engine comprising the steps of:
(a) securing, as a single unit, an engine case of a unitary engine support structure, which includes the engine case, an engine mount, and an exit guide vane, to a forward case portion of an engine such that the engine mount is aft of a fan-turbine rotor assembly in the tip turbine engine; and
(b) securing the exit guide vane of the unitary engine support structure to a static support housing of the engine.

13. The method as recited in claim 12, further comprising the step of forming the unitary engine support structure to include the engine case and the exit guide vane before said step (a) and said step (b).

14. The method as recited in claim 12, wherein said step (a) further comprises welding the engine case to the engine.

15. The method as recited in claim 12, further comprising securing an exhaust mixer to the engine case.

16. The method as recited in claim 12, wherein said step (b) further comprises welding the exit guide vane to the engine.

17. The method as recited in claim 13, further comprising forming the engine case to additionally include an engine mount.

18. The assembly as recited claim 1, further comprising an exhaust mixer fixed to said engine support structure and extending in a flow path from a combustor, and an engine mount fixed to said engine case and extending radially from said engine case, said exhaust mixer and said engine mount being coplanar along a plane that is perpendicular to the engine centerline.

19. The assembly as recited in claim 18, wherein the exhaust mixer, the engine mount, and the exit guide vane are coplanar along the plane that is perpendicular to the engine centerline.

20. The assembly as recited in claim 1, wherein the engine is a tip turbine engine including a hollow fan blade defining a core passage therethrough and a combustor in fluid communication with said core airflow passage.

21. The assembly as recited in claim 9, wherein said core airflow passage includes a turn directing airflow axially forward into said combustor.

22. The assembly as recited in claim 1, wherein the fan-turbine rotor assembly includes a hollow fan blade defining a core airflow passage therethrough, an inducer, and a diffuser that turns airflow axially forward in the engine.

* * * * *